US012765579B2

(12) United States Patent
Mahe et al.

(10) Patent No.: US 12,765,579 B2
(45) Date of Patent: Oct. 20, 2026

(54) LOW DENSITY EDIBLE ANIMAL CHEWS AND METHODS OF MAKING SAME

(71) Applicant: SOCIETE DES PRODUITS NESTLE S.A., Vevey (CH)

(72) Inventors: Yannick Mahe, Amiens (FR); Mario G. Albuja, Eureka, MO (US)

(73) Assignee: Societe des Produits Nestle S.A., Vevey (CH)

( * ) Notice: Subject to any disclaimer, the term of this patent is extended or adjusted under 35 U.S.C. 154(b) by 115 days.

(21) Appl. No.: 19/012,385

(22) Filed: Jan. 7, 2025

(65) Prior Publication Data

US 2025/0143353 A1 May 8, 2025

Related U.S. Application Data

(62) Division of application No. 16/418,195, filed on May 21, 2019, now abandoned, which is a division of (Continued)

(51) Int. Cl.

*A23K 40/20* (2016.01)
*A01K 15/02* (2006.01)

(Continued)

(52) U.S. Cl.

CPC ............ *A23K 40/20* (2016.05); *A01K 15/026* (2013.01); *A23K 10/30* (2016.05); *A23K 20/22* (2016.05); *A23K 40/25* (2016.05); *A23K 50/42* (2016.05)

(58) Field of Classification Search

CPC ........ A23K 40/20; A23K 40/25; A23K 20/22; A23K 50/42; A23K 10/30; A01K 15/026

See application file for complete search history.

(56) References Cited

U.S. PATENT DOCUMENTS 3,723,137 A 3/1973 Fischer et al.
4,332,832 A 6/1982 Buckley et al.

(Continued)

FOREIGN PATENT DOCUMENTS

CA 2819794 A1 8/2012
EP 0909536 A2 4/1999

(Continued)

OTHER PUBLICATIONS

Clextral "Pet food & Treats production lines" http://www.clextral.com/technologies-and-lines/line-feed/pet-foodoroduction-lines/ Jan. 1, 2019, 5 pages.

(Continued)

*Primary Examiner* — Steven N Leff
(74) *Attorney, Agent, or Firm* — K&L Gates LLP

(57) ABSTRACT

Edible chews for pets have a low density (e.g. about 1.0 Kg/L or less) and a smooth exterior surface. One method by which the low density and the smooth exterior surface can be achieved uses a modified extrusion die to increase shear and restrict surface bubbles. Another method by which the low density and the smooth exterior surface can be achieved uses an extruder screw with a modified profile that holds a dough longer therein to create a whipping effect resulting in more bubble nucleation sites and hence a more uniform cellular matrix. The puffed (expanded) product was experimentally tested and provided better dental cleaning scores than a current unexpanded similarly formulated commercial dental product.

5 Claims, 8 Drawing Sheets

Related U.S. Application Data application No. 14/943,176, filed on Nov. 17, 2015, now abandoned.

(60) Provisional application No. 62/083,567, filed on Nov. 24, 2014.

(51) Int. Cl.

| | |
|---|---|
| ***A23K 10/30*** | (2016.01) |
| ***A23K 20/22*** | (2016.01) |
| ***A23K 40/25*** | (2016.01) |
| ***A23K 50/42*** | (2016.01) |

(56) References Cited

U.S. PATENT DOCUMENTS

| | | | | |
|---|---|---|---|---|
| 4,965,081 | A | 10/1990 | Lazarus | |
| 5,333,538 | A | 8/1994 | Sawa | |
| 5,538,744 | A | 7/1996 | Miller et al. | |
| 7,032,541 | B1 | 4/2006 | Tsengas | |
| 2002/0090444 | A1 | 7/2002 | Cupp et al. | |
| 2004/0197455 | A1 | 10/2004 | Nie et al. | |
| 2004/0234654 | A1 | 11/2004 | Levin | |
| 2006/0292288 | A1 | 12/2006 | Russell | |
| 2007/0020355 | A1 | 1/2007 | Schlebusch et al. | |
| 2007/0092620 | A1 | 4/2007 | Zimeri et al. | |
| 2008/0118606 | A1 | 5/2008 | Stern | |
| 2008/0138464 | A1 | 6/2008 | Townsend et al. | |
| 2010/0003492 | A1 | 1/2010 | D'Evelyn | |
| 2010/0034925 | A1 | 2/2010 | Pibarot et al. | |
| 2011/0139087 | A1 | 6/2011 | Lang et al. | |
| 2012/0156674 | A1 | 6/2012 | Finkelstein et al. | |
| 2013/0295235 | A1 * | 11/2013 | Albuja | A23K 50/40 426/89 |

FOREIGN PATENT DOCUMENTS

| | | | |
|---|---|---|---|
| EP | 1017288 | B1 | 7/2000 |
| EP | 1800545 | | 6/2004 |
| EP | 2011404 | | 1/2009 |
| EP | 2712288 | | 4/2014 |
| ES | 2212538 | T3 | 7/2004 |
| ES | 2322233 | T3 | 6/2009 |
| JP | S6427436 | | 1/1989 |
| JP | 2008029339 | | 2/2008 |
| JP | 2014527409 | | 10/2014 |
| WO | 9619120 | A1 | 6/1996 |
| WO | 03024240 | A1 | 3/2003 |
| WO | 2008014000 | A1 | 1/2008 |
| WO | 2012156674 | A1 | 11/2012 |
| WO | 2013158286 | A1 | 10/2013 |
| WO | 2014155113 | | 10/2014 |

OTHER PUBLICATIONS

Moraru et al., "Nucleation and Expansion During Extrusion and Microwave Heating of Cereal Foods" Comprehensive in food science and food safety, vol. 2, 2003, pp. 147-165.

International Search Report and Written Opinion dated Feb. 17, 2016.

"Starmark—Our products", Animal Behavior Center, https://www.starmarkacademy.com/products, 2011, pp. 7.

Moraru et al., "Nucleation and Expansion During Extrusion and Microwave Heating of Cereal Foods", Comprehensive Reviews In Food Science and Food Safety, https://onlinelibrary.wiley.com/doi/pdf/10.1111/j.1541-4337.2003.tb00020.x, vol. 2, 2003, pp. 147-165.

Clextral, "Pet Food & Treats Production Lines", http://www.clextral.com/technologies-and-lines/linefeed/pet-food-production-lines, 2013, pp. 3.

* cited by examiner

LOW DENSITY EDIBLE ANIMAL CHEWS AND METHODS OF MAKING SAME

CROSS REFERENCE TO RELATED APPLICATIONS

This application is a divisional of U.S. application Ser. No. 16/418,195 filed May 21, 2019, which is a divisional of U.S. application Ser. No. 14/943,176 filed Nov. 17, 2015, which claims priority to U.S. Provisional Application No. 62/083,567 filed Nov. 24, 2014, the entire disclosures of which are incorporated herein by this reference.

BACKGROUND

The present disclosure relates generally to low density edible chews having a cellular matrix that provides sufficient bite depth to facilitate mechanical teeth cleaning and further relates to methods of making such chews. More specifically, the present disclosure is directed to edible chews having a low density and a smooth exterior surface that can be achieved by modifying an extrusion process.

Animal chew toys are designed to entertain the animal, combat animal boredom, prevent destructive animal chewing behavior, and provide an outlet for an animal's innate chewing instinct. Generally, animal chew toys are made from plastic or other material that cannot be eaten by the animal. Animals typically tire of non-edible animal chew toys after a short period of time and move on to other activities. Moreover, non-edible animal chew toys provide no nutritional value to the animal and are limited in providing a health benefit to the animal.

Edible chews have been developed, but they are based on expensive ingredients, mainly pre-gelatinized rice or corn, which have a negative impact on the manufacturing cost. Furthermore, known edible chews have relatively poor dental efficacy (around 30-35% tartar build up reduction) for two potential reasons: their limited thickness (the teeth do not penetrate very deeply into the chew before breakage) and their limited duration.

A lower density of the chew could possibly require the animal teeth to penetrate deeply into the chew. However, to the best knowledge of the present inventors, there is no known solution to obtain highly performing and appealing low density chews, especially from formulae based on pre-gelatinized starches. In this regard, the expansion of pre-gelatinized starches is difficult to monitor, and the final product shape is difficult to control. For example, the final product has a very rough surface and a burgeoning structure that is unsatisfactory. In this regard, standard extrusion dies with a smooth surface, whatever the shape, lead to an unappealing product surface with numerous blisters ("toad skin").

SUMMARY

The present disclosure provides edible chews having a low density (e.g. about 1.0 Kg/L or less) and a smooth exterior surface. As a non-limiting example, the low density and the smooth exterior surface can be achieved by modifying an extrusion die to restrict surface bubbles. As another non-limiting example, the low density and the smooth exterior surface can be achieved by modifying the profile of an extruder screw to hold a dough longer therein, to create a whipping effect resulting in more bubble nucleation sites and hence a more uniform cellular matrix. In both of these examples, the effect can be enhanced by adding a bicarbonate such as sodium bicarbonate to produce smaller foam cells.

Accordingly, in a general embodiment, the present disclosure provides an edible pet chew comprising an expanded pre-gelatinized cereal flour matrix and having a substantially smooth exterior surface and a density not greater than about 1.0 Kg/L.

In an embodiment, the chew has a form of single unitary piece.

In an embodiment, the chew does not contain a supercritical fluid.

In an embodiment, the chew has a caloric density of 1.5-2.7 Kcal/cm3.

In an embodiment, the density is at most about 0.9 Kg/L.

In an embodiment, the chew comprises a body having a substantially cylindrical shape and comprises radial ridges extending from the body parallel to each other along at least a portion of the length of the body.

In another embodiment, the present disclosure provides a method of making an edible pet chew. The method comprises the steps of: preparing a dry mix comprising a pre-gelatinized cereal flour; metering the dry mix into an extruder comprising an extrusion die; adding a hydrogen bond-forming component to the dry mix to form a dough; promoting nucleation of the dough by subjecting the dough to a combination of shear and a temperature in a section of the extruder adjacent to the extrusion die to form a heated and sheared dough, the temperature in the section adjacent to the extrusion die is higher than a temperature of at least one previous section of the extruder; and directing the heated and sheared dough through an opening of the extrusion die comprising grooves, each of the grooves has an open end and a bottom surface opposite to the open end, and the width of the bottom surface is greater than the width of the open end.

In an embodiment, the grooves have a substantially triangular cross-section (dove-tail shape).

In an embodiment, the grooves have a width that continuously decreases as the grooves extend toward the center of the opening.

In an embodiment, the grooves are evenly spaced along an inner periphery of the opening of the extrusion die.

In an embodiment, the temperature in the section of the extruder adjacent to the extrusion die is at least 120° C.

In an embodiment, the hydrogen bond-forming component comprises a polyhydric solvent.

In another embodiment, the present disclosure provides a method of making an edible pet chew. The method comprises the steps of: preparing a dry mix comprising a pre-gelatinized cereal flour and a bicarbonate; metering the dry mix into an extruder comprising an extrusion die; adding a hydrogen bond-forming component to the dry mix to form a dough; and promoting nucleation of the dough by subjecting the dough to a combination of shear and a temperature in a section of the extruder adjacent to the extrusion die to form a heated and sheared dough, the temperature in the section adjacent to the extrusion die is higher than a temperature of at least one previous section of the extruder.

In an embodiment, the bicarbonate is sodium bicarbonate. The dry mix can comprise 0.2 to 1.5 wt % of the sodium bicarbonate, for example 0.5 to 1.5 wt % of the sodium bicarbonate.

In another embodiment, the present disclosure provides a method of making an edible pet chew. The method comprises the steps of: preparing a dry mix comprising a pre-gelatinized (pregelled) cereal flour; metering the dry mix into an extruder comprising an extrusion die and a barrel comprising a vent and a vent-stuffer; adding a hydrogen bond-forming component to the dry mix to form a dough; using a reverse element of the extruder to extend a time spent by the dough in the barrel comprising the vent and the vent-stuffer; using mixing elements in the barrel comprising the vent and the vent-stuffer to whip the dough and promote nucleation; and promoting further nucleation of the dough by subjecting the dough to a combination of shear and a temperature in a section of the extruder adjacent to the extrusion die to form a heated and sheared dough, the temperature in the section of the extruder adjacent to the extrusion die is higher than a temperature of at least one previous section of the extruder. Extending the time spent by the dough in the first section can provide for a better whipping of the dough.

In an embodiment, the method comprises adding a bicarbonate to the dry mix.

In an embodiment, the method comprises aerating the dough in the barrel comprising the vent and the vent-stuffer.

In an embodiment, the vent and the vent-stuffer are configured to provide ambient pressure.

In another embodiment, the present disclosure provides an edible pet chew made by a process selected from the above methods.

In another embodiment, the present disclosure provides a pet treat comprising: an edible pet chew comprising an expanded pre-gelatinized cereal flour matrix and having a substantially smooth exterior surface and a density not greater than about 1.0 Kg/L; and at least one filling comprising radial sides surrounded by the edible pet chew.

In another embodiment, the present disclosure provides a method of cleaning teeth of a pet, the method comprising administering to the pet an edible pet chew comprising an expanded pre-gelatinized cereal flour matrix and having a substantially smooth exterior surface and a density not greater than about 1.0 Kg/L.

An advantage of the present disclosure is to provide improved edible chews for pets.

Another advantage of the present disclosure is to provide improved methods of making edible chews for pets.

Still another advantage of the present disclosure is to provide edible pet chews that increase consumer appeal/credibility on a similar weight basis compared to existing chews, due to product volume.

Yet another advantage of the present disclosure is to produce edible pet chews at a reduced cost on a similar volume basis compared to existing chews.

Another advantage of the present disclosure is to provide edible pet chews having reduced calories on a similar volume basis compared to existing chews.

Still another advantage of the present disclosure is to provide increased feeding opportunities due to improved edible chew properties (e.g. low caloric density and good resistance to shear), leading to increased interactions between a dog and the owner of the dog.

Yet another advantage of the present disclosure is to provide edible pet chews that have improved dental efficacy on a similar weight basis compared to existing chews, due to an increased product thickness and a pumice structure.

Still another advantage of the present disclosure is to provide edible pet chews that have a low density and an aerated structure but nevertheless provide chewing properties on a similar weight basis as compared to normal high density chews.

Yet another advantage of the present disclosure is to produce edible pet chews that have a low density and thus provide an excellent volume impression, which may be used to reduce product weight and therefore raw material cost.

Another advantage of the present disclosure is to provide edible pet chews having a pumice structure that has a multi-blade effect that achieves a better teeth-cleaning and therefore a better reduction of tartar build up compared to existing chews.

Still another advantage of the present disclosure is to provide low density edible pet chews that have better a cosmetic impression than blistered chews, by having larger smooth surfaces.

Yet another advantage of the present disclosure is to produce edible pet chews that have a low density without using a supercritical fluid.

Another advantage of the present disclosure is to provide edible pet chews that have an alveolar structure without compromising resistance to shear.

Still another advantage of the present disclosure is to provide low density edible pet chews that have rubbery character.

Additional features and advantages are described herein, and will be apparent from the following Detailed Description and the Figures.

DETAILED DESCRIPTION

Figure 1:
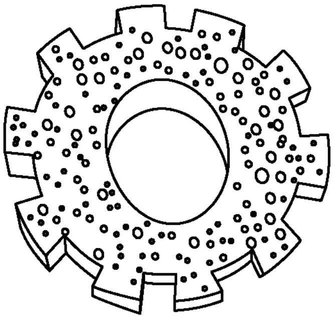
FIGS. 1-5 are photographs of the edible pet chews made in the experimental examples disclosed herein.

As used in this disclosure and the appended claims, the singular forms "a," "an" and "the" include plural referents unless the context clearly dictates otherwise. Thus, for example, reference to "a meat" includes two or more meats. The term "and/or" used in the context of "X and/or Y" should be interpreted as "X," or "Y," or "X and Y."

As used herein, "about" and "substantially" are understood to refer to numbers in a range of numerals, for example the range of −10% to +10% of the referenced number, preferably within-5% to +5% of the referenced number, more preferably within −1% to +1% of the referenced number, most preferably within −0.1% to +0.1% of the referenced number. Furthermore, all numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

All percentages expressed herein are by weight of the total weight of the composition unless expressed otherwise. When reference is made to the pH, values correspond to pH measured at 25° C. with standard equipment. "Ambient pressure" is about 100 kPa.

The term "pet" means any animal which could benefit from or enjoy the compositions provided by the present disclosure. For example, the pet can be an avian, bovine, canine, equine, feline, hircine, lupine, murine, ovine, or porcine animal, but the pet can be any suitable animal. The term "companion animal" means a dog or a cat.

The terms "food," "food product" and "food composition" mean a product or composition that is intended for ingestion by an animal, including a human, and provides at least one nutrient to the animal. The term "pet food" and "pet treat" mean any food composition intended to be consumed by a pet. The term "edible chew" means a comestible product that requires a longer chewing time before the product can be ingested, relative to a standard comestible product. Preferably the edible chew requires at least one minute of chewing before the product can be ingested, for example one to four minutes of chewing before the product can be ingested. A "smooth surface" of the chew means a surface that is substantially free from undulations, blisters and bumps.

"Dry food" is pet food having a water activity less than 0.75. "Semi-moist food" and "intermediate moisture food" is pet food having a water activity from 0.75 to 0.85. "Wet food" is pet food having a water activity more than 0.85.

The compositions disclosed herein may lack any element that is not specifically disclosed herein. Thus, a disclosure of an embodiment using the term "comprising" includes a disclosure of embodiments "consisting essentially of" and "consisting of" the components identified. Similarly, the methods disclosed herein may lack any step that is not specifically disclosed herein. Thus, a disclosure of an embodiment using the term "comprising" includes a disclosure of embodiments "consisting essentially of" and "consisting of" the steps identified.

In an aspect of the present disclosure, an edible pet chew having a low density and a smooth exterior surface is provided. For example, the edible pet chew can have a density of 0.5 Kg/L to 1.0 Kg/L, for example 0.5 Kg/L to about 0.9 Kg/L, such as about 0.9 Kg/L. In some embodiments, the edible pet chew has a density of about 0.5 Kg/L or less, such as about 0.5 Kg/L. The edible pet chew preferably is a single unitary piece that is substantially homogenous and has substantially the same texture throughout. In an embodiment, the chew has a caloric density of 1.5 Kcal/cm3 to 2.7 Kcal/cm3, for example about 2.1 Kcal/cm3. An edible chew typically has a water activity of 0.65 to 0.75, but some embodiments of the edible pet chews disclosed herein have a slightly lower water activity, for example 0.6 to 0.7.

Figure 8:
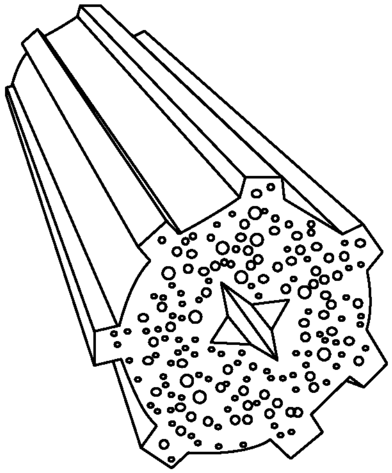
FIG. 8 is a photograph of an embodiment of an edible pet chew made using a star-shaped insert according to the present disclosure.

In an embodiment, the chew comprises a body having a substantially cylindrical shape and comprises radial ridges extending from the body parallel to each other along at least a portion of the length of the body, for example an entire length of the body (e.g. the embodiment shown in FIG. 8). However, the edible pet chew can have any shape (e.g. the embodiments shown in FIG. 10), and the edible pet chew is not limited to a specific shape.

In another aspect of the present disclosure, a pet treat is provided comprising the edible chew and one or more fillings therein. For example, the pet treat can be a co-extruded product comprising the edible chew and a soft filling surrounded at least on radial sides by the edible chew (e.g. the filling can be exposed at the ends of the chew). The filling may contain additional teeth cleaning compounds, such as Tetrasodium Pyrophosphate (TSPP) and/or breath-freshening compounds.

In yet another aspect of the present disclosure, a method of making an edible pet chew is provided. The method can comprise using a dry mix by mixing pre-gelatinized cereal flour to form a dry mix. Non-limiting examples of suitable pre-gelatinized cereal flours include pre-gelatinized rice flour, pre-gelatinized wheat flour, pre-gelatinized corn flour, pre-gelatinized barley flour, pre-gelatinized sorghum flour, and pre-gelatinized millet flour, and combinations thereof. Optionally the dry mix can include other components in addition to the pre-gelatinized cereal flour, such as one or more of a protein source, vitamin, a mineral, a preservative, an antioxidant, a colorant, a palatant, or a flavorant. Preferably the method of making an edible pet chew does not involve using a supercritical fluid.

Non-limiting examples of suitable vitamins include vitamin A, any of the B vitamins, vitamin C, vitamin D, vitamin E, and vitamin K, including various salts, esters, or other derivatives of the foregoing. Non-limiting examples of suitable minerals include calcium, phosphorous, potassium, sodium, iron, chloride, boron, copper, zinc, magnesium, manganese, iodine, selenium, and the like. In a particularly preferred embodiment, calcium hydrogen phosphate can be used as a calcium source. Non-limiting examples of suitable preservatives include potassium sorbate, sorbic acid, sodium methyl para-hydroxybenzoate, calcium propionate, propionic acid, and combinations thereof. The antioxidant can provide an aesthetic effect and influence the odor of the edible pet chew, particularly during extended shelf-life. Non-limiting examples of suitable antioxidants include butylated hydroxyanisole (BHA), butylated hydroxytoluene (BHT), vitamin E (tocopherols), and combinations thereof. Non-limiting examples of suitable colorants include FD & C colors, such as blue no. 1, blue no. 2, green no. 3, red no. 3, red no. 40, yellow no. 5, yellow no. 6, and the like; natural colors, such as roasted malt flour, caramel coloring, annatto, chlorophyllin, cochineal, betanin, turmeric, saffron, paprika, lycopene, elderberry juice, pandan, butterfly pea and the like; titanium dioxide; and any suitable food colorant known to the skilled artisan. Non-limiting examples of suitable palatants flavorants include yeast, tallow, rendered animal meals (e.g., poultry, beef, lamb, and pork), flavor extracts or blends (e.g., grilled beef), animal digests, and the like.

The dry mix can contain emulsifiers and stabilizers such as soy lecithin, mono- and di-glycerides, and the like. In an embodiment, the composition does not contain any lipids, and/or the emulsifier is the only lipid in the composition. Meat flours can be added to the dry mix and would be a source of lipids. Chicken fat can be used to reduce stickiness if needed, although higher temperature may be required to achieve the same expansion relative to a composition lacking chicken fat. In an embodiment, any protein from the pre-gelatinized cereal flour is the only protein in the composition. Some other protein sources might be used for substantiation of nutritional claims (e.g. meat meals, greaves meals, etc.), the addition level being appropriate not to prevent expansion.

A component capable of forming hydrogen bonds in the pre-gelatinized cereal flour can be added to the dry mix to form dough that is dynamically cooked in an extruder. The component capable of forming hydrogen bonds is preferably added to the dry mix in the extruder. The component can comprise a polyhydric solvent which is preferably non-aqueous and preferably ethylene glycol, propylene glycol, glycerol or a combination thereof. Water and/or an additional preservative may also be added to the dry mix. In an embodiment, the water content may be from 7.5% to 11.9%, the glycerin content may be from 13.4% to 17.9%, and the amount of the dry mix may be from 71.4% to 78.1% of the flour.

In the extruder, the dough constituents can mix with each other while shear is imparted within the extruder barrel. Preferably the extruder has a plurality of successive barrels, and the temperature increases in one or more of the barrels adjacent the die through which the cooked dough exits, relative to the prior barrels. For example, the barrel at the exit end of the extruder can be heated to a temperature of about 120° C., and one or more of the prior barrels can be heated to a temperature of about 80° C. The temperature increase at the exit end of the extruder can cause sudden and extensive formation of gas in the dough, resulting in expansion of the dough at both a microscopic and macroscopic level as bubbling gas attempts to escape the material.

As a non-limiting example, the initial barrels (e.g. the 6 first barrels) are not heated, for example by having the temperature therein set to around 25° C., although the temperature of these barrels is not necessarily the set temperature because the cooling capacity is not always sufficient. The temperature of the last barrels (e.g. the last four barrels) may be 80-120° C. for low product throughput (100-150 kg/h) and may be lower for higher throughput (high shearing due to screw speed). Moreover, the temperature of the last barrels can be lower if the last part of the screw profile therein is stronger. The average pressure at the front plate can be about 75 bars at 115 kg/h on a one rope die; higher pressure (e.g. about 95 bars) can be reached at higher throughput 400 kg/h on a four rope die. The average SME value can be 400-450 KJ/kg on dry basis.

In a first embodiment, a low density (a density of about 0.7 Kg/L or less, such as about 0.7 Kg/L) and a smooth exterior surface of the edible pet chew can be achieved by at least one of the following: (i) a specific design of the extrusion die or (ii) addition of a bicarbonate such as sodium bicarbonate to the dry mix. In this first embodiment, the extruded material is aerated; if the extruded material is not aerated, the density will be around 1.2-1.3 kg/L. Preferably, a venting barrel is not used. In this first embodiment, the expansion can be primarily in a radial direction.

Figure 6:
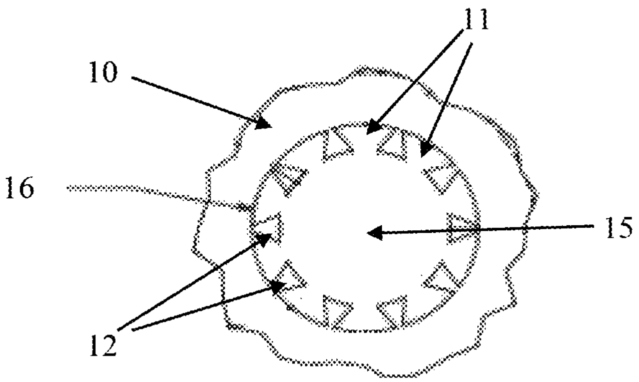
FIG. 6 is a front plan view of an embodiment of an extrusion die provided by the present disclosure.

FIG. 6 generally illustrates an embodiment of an extrusion die 10 that can achieve a low density and a smooth exterior surface of the edible pet chew. The extrusion die 10 can comprise dovetail grooves 11 through which the material is extruded. For example, the extrusion die 10 can comprise an opening 15, and the dovetail grooves 11 can be formed in the inner periphery 16 of the opening 15. Each of the dovetail grooves 11 has an open end and a bottom surface that is opposite to the open end.

The dovetail grooves 11 each have an inner width and an outer width that are perpendicular to the direction of extrusion (i.e. the longitudinal axis of the extruder), the inner width is closer to the center of the opening 15, and each of the inner widths is shorter than the corresponding outer width. The center of the opening 15 is preferably on the longitudinal axis of the extruder. The inner width is the width of the open end of the dovetail groove 11, and the outer width is the width of the bottom surface of the dovetail groove 15.

Preferably each of the dovetail grooves 11 have a substantially triangular cross-sectional shape; for example, the width of each the dovetail grooves 11 can continuously increase as the dovetail grooves 11 extend outward relative to the center of the opening 15. In an embodiment where the opening 15 is circular, the open ends of the dovetail grooves 15 can be positioned along a first circumference, and the bottom surfaces of the dovetail grooves 15 can be positioned along a second circumference concentric with the first circumference but larger than the first circumference.

In an embodiment, the dovetail grooves 11 can be formed by projections 12 that extend inward from the inner periphery 16 of the opening 15. The inner widths of the projections 12 can be positioned on the same first circumference as the inner widths of the dovetail grooves 11, the outer widths of the projections 12 can be positioned on the same second circumference as the outer widths of the dovetail grooves 11, and each of the outer widths of the projections 12 can be shorter then the corresponding inner width of the projection 12. The figure shows ten of the dovetail grooves 11 and ten of the projections 12, but any number can be used, and the extrusion die 10 is not limited to a specific number of the dovetail grooves 11 and the projections 12.

Without being bound by theory, the inventors believe that known dies with little straight grooves all around give a product with alternating smooth and blistered surfaces, the smooth surfaces corresponding to the external part of the grooves. The inventors believe that the flow inside the grooves is slightly reduced, resulting in lower pressure, which prevents the development of steam bubbles as extensively as in the die core (less "flashing"). Replacing straight and narrow grooves with large dovetail grooves provides a product with a better cosmetic impression, due to the smooth surface being larger.

Additionally or alternatively to using an extrusion die comprising dovetail grooves, a bicarbonate such as sodium bicarbonate can be included in the dry mix. For example, the dry mix can comprise 0.2 to 1.5 wt % sodium bicarbonate, for example 0.5 to 1.5 wt % sodium bicarbonate. Without being bound by theory, the inventors believe that the carbon dioxide released from the bicarbonate submitted to heat and/or acid promote nucleation (more nucleation sites) and helps to decrease the size of the foam cells that form in the material during extrusion.

In a second embodiment, a low density (a density of about 1.0 Kg/L or less, such as about 1.0, or even about 0.9 Kg/L or less, such as about 0.9 Kg/L) and a smooth exterior surface of the edible pet chew can be achieved by incorporating air into the dough during extrusion to aerate the dough. In this second embodiment, the expansion can be primarily in a radial direction, although the use of a bicarbonate such as sodium bicarbonate can result in combined axial and radial expansion in this embodiment.

In this embodiment, the extruder can comprise a barrel comprising a vent that is open to the atmosphere and comprising a vent-stuffer, and the dough in the venting barrel must be viscous enough to entrap air. A reverse element can be positioned after the venting barrel to maintain the dough for an extended period of time in the venting barrel. The reverse element can be a reverse screw element or any element that generates backpressure in the extruder. The extended period of time spent by the dough in the venting barrel in the presence of the mixing elements therein can ensure an efficient mixing and/or whipping of the dough.

The vent in the venting barrel that is open to the atmosphere can allow air to penetrate into the extruder and push the dough, potentially coming through the vent, back into the extruder. However, in a preferred embodiment, forced gas injection is not used.

This "whipping" process promotes nucleation such that a very foamy and light dough is obtained. The phenomenon is visible right after the front plate, on the opposite of the previous alternatives where the bubbles mainly grow at the die exhaust. Because of the very tiny bubble size, product surface is smooth and product shape well defined.

Addition of a bicarbonate such as sodium bicarbonate to the dry mix can increase the nucleation even further. The density may thus be even lighter (about 0.7 Kg/L or less, such as about 0.7 Kg/L) and, in some conditions, the bubbles may be hardly visible even though the density is reduced by more than 50% relative to commercial edible pet chews.

In the first and second embodiments, as well as any other embodiments used to make the edible pet chew, the edible chew can be used in a pet treat in which the edible chew surrounds one or more fillings. Each of the one or more fillings may contain teeth cleaning compounds, such as Tetrasodium Pyrophosphate (TSPP) and/or or breath-freshening compounds. In an embodiment, at least one of the edible pet chew or the filling comprises a probiotic microorganism. The one or more fillings can extend parallel to the radial ridges of the edible pet chew.

Figure 9A:
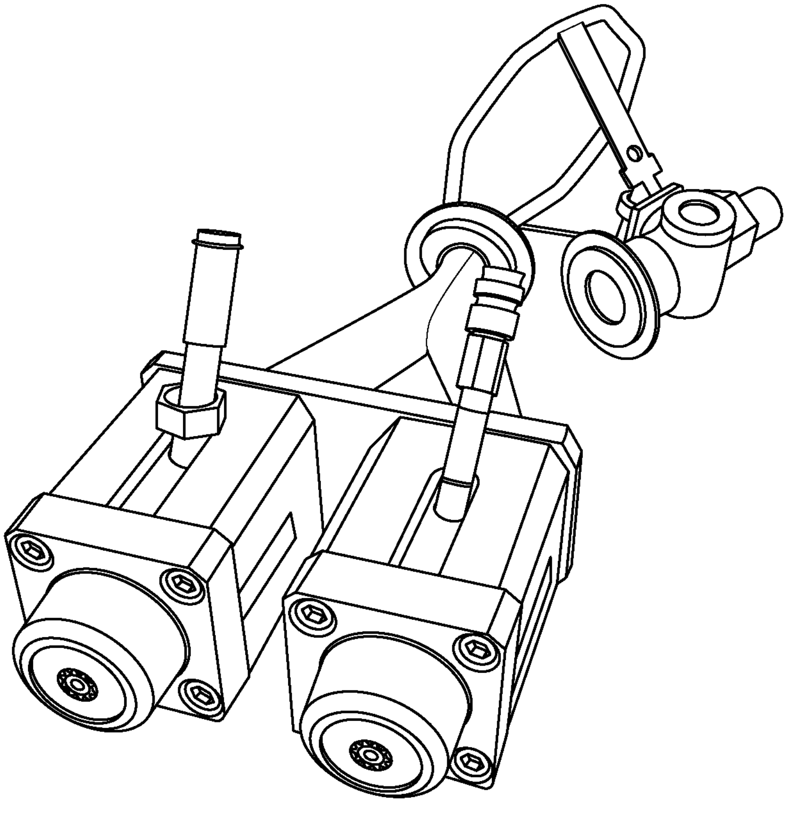
FIG. 9A is a photograph of an embodiment of a device for making an edible pet chew comprising a filling according to the present disclosure.
Figure 9B:
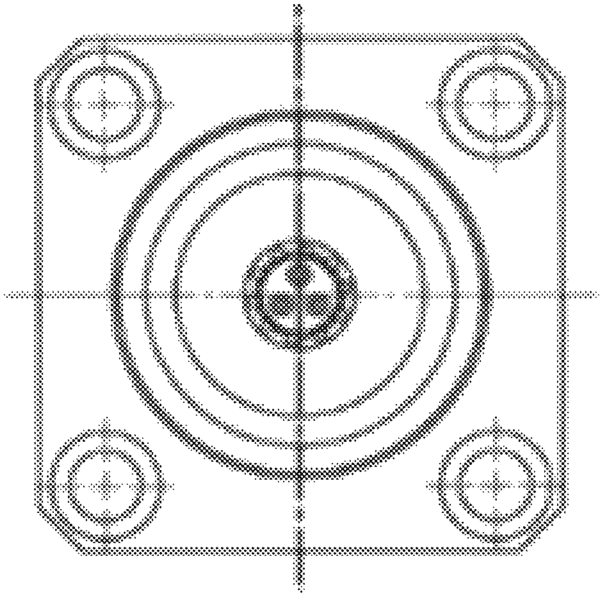
FIG. 9B is front plan view of an embodiment of an extrusion die that can be used in the device shown in FIG. 9A.

The pet treat can be made by co-extruding the edible pet chew and the one or more fillings. For example, as generally shown in FIG. 9B, one or more filling ports (internal inserts) can be inserted in the chew inserts (external insert); the distance between the internal inserts and the distance between the internal inserts and the external insert are large enough to allow the chew dough to circulate without any preferred flow; the section of the internal inserts should be large enough to avoid too high pressure.

EXAMPLES

By way of example and not limitation, the following examples are illustrative of embodiments of the present disclosure.

Example 1

Ingredients for a 500 Kg batch of Dry Mix were weighed out according to the percentages shown in Table 1 into a batch mixer and blended for five minutes. Although pregelled corn flour was used, additionally or alternatively any pre-gelled cereal flour can be used.

The Dry Mix was metered into an Evolum EV53 (Clextral) twin screw extruder along with the glycerin/phosphoric acid mixture and water in the proportions shown in Table 1 and equaling 115 Kg/hour, where they were mixed under pressure (64 bars) and achieved a temperature of 117° C. to form a plastic dough. Phosphoric acid is not required but was included for additional preservative effect.

TABLE 1

| | Ingredients | Amount (%) |
|---|---|---|
| DRY MIX | Pregelled Corn Flour | 83.58 |
| | Wheat Flour | 6.0 |
| | Brewer's Dried Yeast | 3.0 |
| | Calcium Hydrogen Phosphate | 3.0 |
| | Distilled Monoglyceride | 1.5 |
| | Vitamin Premix | 1.5 |
| | Potassium Sorbate | 0.6 |
| | Titanium Dioxide | 0.4 |
| | Calcium Propionate | 0.4 |
| | BHT Powder | 0.02 |
| | TOTAL | 100 |
| EXTRUSION | Dry Mix | 73.9 |
| | Glycerin/Phosphoric Acid (16:1) | 16.3 |
| | Water | 9.8 |
| | TOTAL | 100 |

Figure 7A:
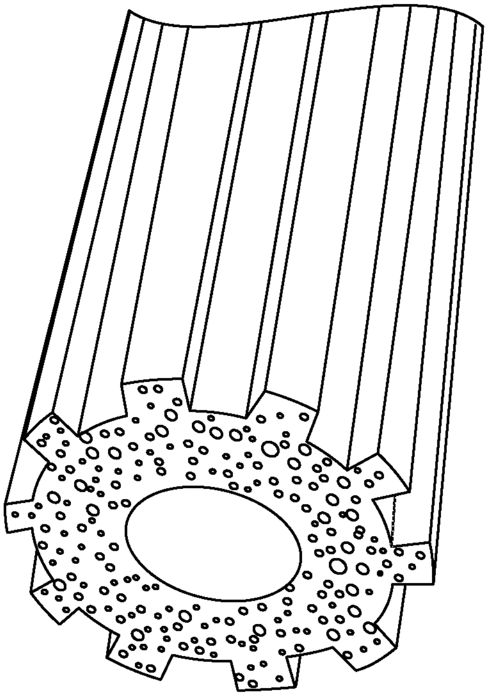
FIGS. 7A and 7B are photographs of an edible pet chew made by the embodiment of an extrusion die shown in FIG. 6.
Figure 7B:
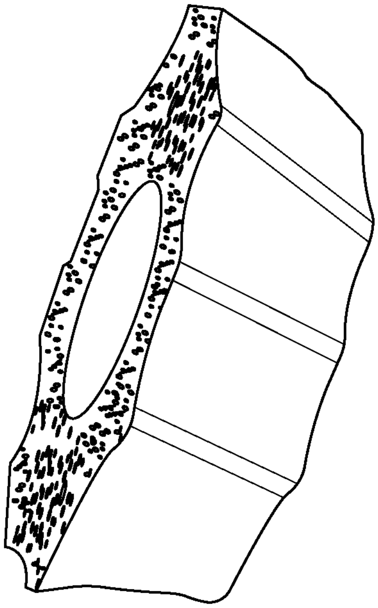
Figure 11:
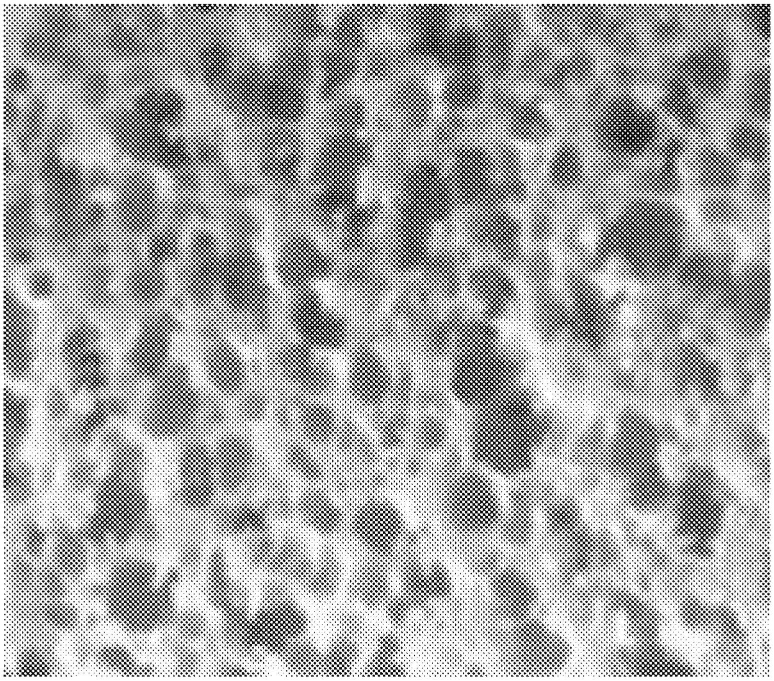
FIG. 11 is a close-up photograph of the cellular texture of an embodiment of an edible pet chew according to the present disclosure.

The extruder was equipped with 10 barrel sections and had an L/D ratio of 40. To achieve moderate shearing, one reversing screw element was inserted at the end of the fourth barrel, and two such elements were inserted at the end of the fifth barrel. The screws turned at 140 rpm and attained a specific mechanical energy (SME) of 430 KJ/Kg dry materials input. Barrels 7-10 were heated. The plastic dough was then extruded through a die system with opening shown in FIG. 6 and cut into 120 mm long dense pieces having a density of 0.9 Kg/L (FIG. 1). The die with dovetail design (FIG. 6) was found to avoid a blistered, rough outer surface and produce an acceptably smooth outer surface (FIGS. 7A and 7B), and the edible chew had an expanded cellular internal structure (FIG. 11). Moreover, a single tubular insert was inserted within the die opening to form a hollow part in the product piece (FIG. 1).

Figure 10A:
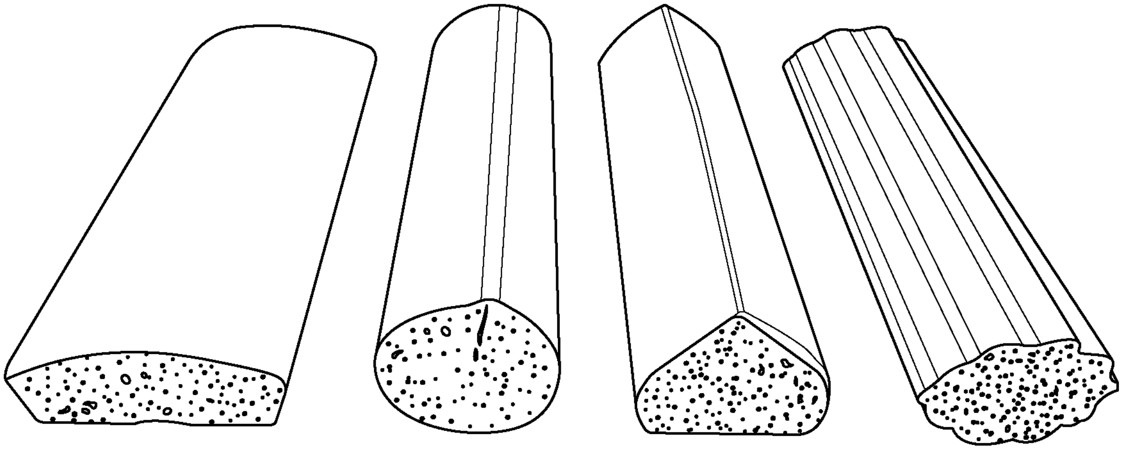
FIGS. 10A and 10B are photographs of differently-shaped embodiments of edible pet chews according to the present disclosure.
Figure 10B:
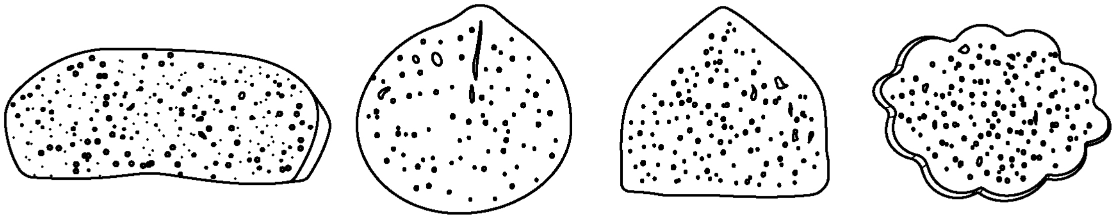

Although the single insert was cylindrical, the insert can be any shape, such as triangular, rectangular, polygonal, star-shaped, or the like, to form a corresponding cross-sectional shape of the hollow part of the chew; FIG. 8 depicts an embodiment of the edible pet chew made using a star-shaped insert. Furthermore, although the die was cylindrical, the die can be any symmetrical or non-symmetrical shape to form a corresponding cross-sectional shape of the body of the chew, as shown in FIGS. 10A and 10B.

Example 2

Figure 2:
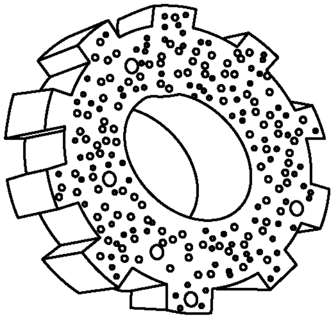

Example 1 was repeated with the following exceptions. 0.5% sodium bicarbonate was added to the dry mix shown in Table 1 and the pre-gelled corn flour was reduced accordingly to 83.08%. The maximum pressure and SME were 67 bars and 447 KJ/Kg respectively. The plastic dough was then extruded through a die system with opening shown in FIG. 6 and cut into 120 mm long pieces having a density of 0.74 Kg/L and with an expanded cellular internal structure (FIG. 2). The die with dovetail design (FIG. 6) was found to avoid a blistered, rough outer surface and produce an acceptably smooth outer surface. Moreover, a single tubular insert was inserted within the die opening to form a hollow part in the product piece (FIG. 2).

Example 3

Figure 3:
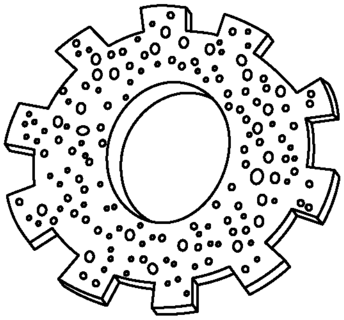

Example 2 was repeated with the following exceptions. 1% sodium bicarbonate was added to the dry mix shown in Table 1 and the pre-gelled corn flour was reduced accordingly to 82.58%. The maximum pressure and SME were 67 bars and 452 KJ/Kg respectively. The plastic dough was then extruded through a die system with opening shown in FIG. 6 and cut into 120 mm long pieces having a density of 0.68 Kg/L and with an expanded cellular internal structure (FIG. 3). The die with dovetail design (FIG. 6) was found to avoid a blistered, rough outer surface and produce an acceptably smooth outer surface. Moreover, a single tubular insert was inserted within the die opening to form a hollow part in the product piece (FIG. 3).

Example 4

Example 3 was repeated with the following exceptions. 0.25% sodium bicarbonate was added to the Dry Mix as shown in Table 2. The Dry Mix was metered at 230 Kg/hr into an Evolum EV 53 (Clextral) twin screw extruder along with glycerin and water in proportions shown in Table 2. The screw speed, maximum pressure, temperature, and SME were 350 rpm, 90 bars, 113° C., and 530 KJ/Kg respectively. The plastic dough was then extruded through a die system with opening shown in FIG. 6 and cut into 130 mm long pieces having a density of 0.76 Kg/L and with an expanded cellular internal structure (FIG. 3). The die with dovetail design (FIG. 6) was found to avoid a blistered, rough outer surface and produce an acceptably smooth outer surface. Moreover, a single tubular insert was inserted within the die opening to form a hollow part in the product piece (FIG. 3).

TABLE 2

| | Ingredients | Amount (%) |
|---|---|---|
| DRY MIX | Pregelled Corn Flour | 79.80 |
| | Wheat Flour | 6.39 |
| | Calcium Hydrogen Phosphate | 4.86 |
| | Brewer's Dried Yeast | 3.00 |
| | Distilled Monoglyceride | 1.50 |
| | Chicken by product | 1.45 |
| | Vitamin Premix | 0.89 |
| | Roasted malt flour | 0.80 |
| | Potassium Sorbate | 0.60 |
| | Calcium Propionate | 0.41 |
| | Sodium bicarbonate | 0.25 |
| | Silicium dioxide | 0.03 |
| | BHT Powder | 0.02 |
| | TOTAL | 100 |
| EXTRUSION | Dry Mix | 75.7 |
| | Glycerin | 14.0 |
| | Water | 10.3 |
| | TOTAL | 100 |

Example 5

Figure 4:
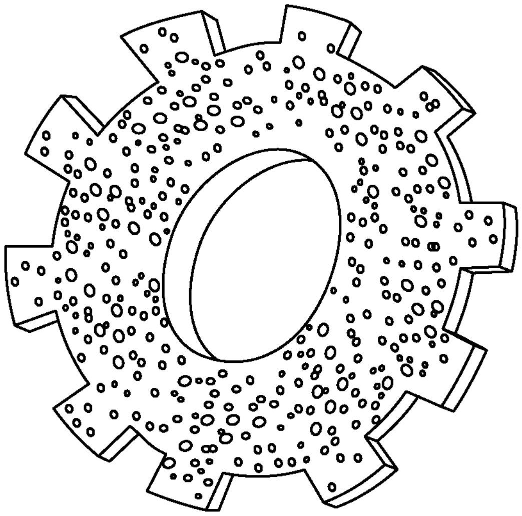

Example 1 was repeated with the following exceptions. The screw profile was modified for high shear. To achieve this high shear, an additional reversing screw element was inserted at the head of the seventh barrel. To allow air incorporation, a vent-stuffer was inserted on the sixth barrel, and two mixing elements were inserted in the middle of the sixth barrel below the vent-stuffer. The maximum pressure and SME were 66 bars and 475 KJ/Kg respectively. The plastic dough was then extruded through a die system with opening shown in FIG. 6 and cut into 120 mm long pieces having a density of 0.67 Kg/L and with an expanded cellular internal structure (FIG. 4). The die with dovetail design (FIG. 6) was found to avoid a blistered, rough outer surface and produce an acceptably smooth outer surface. Moreover, a single tubular insert was inserted within the die opening to form a hollow part in the product piece (FIG. 4).

Example 6

Figure 5:
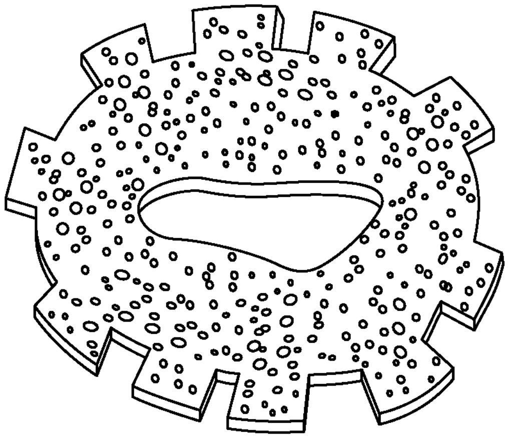

Example 4 was repeated with the following exceptions. 0.5% sodium bicarbonate was added to the dry mix shown in Table 1 and the pre-gelled corn flour was reduced accordingly to 83.08%. The maximum pressure and SME were 62 bars and 450 KJ/Kg respectively. The plastic dough was then extruded through a die system with opening shown in FIG. 6 and cut into 120 mm long pieces having a density of 0.51 Kg/L and with an expanded fine cellular internal structure (FIG. 5). The die with dovetail design (FIG. 6) was found to avoid a blistered, rough outer surface and produce an acceptably smooth outer surface. Moreover, a single tubular insert was inserted within the die opening to form a hollow part in the product piece (FIG. 5).

Example 7

Ingredients for a 909 Kg batch of Dry Mix were weighed out according to the percentages shown in Table 3 into a batch mixer and blended. The Dry Mix was metered into a Single Screw Extruder equipped with a pre-conditioner along with the glycerin, water and phosphoric acid in the proportions shown in Table 3, where they were mixed under pressure (60 bars) and achieved a temperature of 110° C. to form a plastic dough.

TABLE 3

| | Ingredients | Amount (%) |
|---|---|---|
| DRY MIX | Pregelled Rice Flour | 73.86 |
| | Wheat Flour | 17.10 |
| | Monocalcium-Dicalcium Phophaste | 1.00 |
| | Distilled Monoglyceride | 1.80 |
| | Chicken by product meal | 2.50 |
| | Sorbic acid | 0.50 |
| | Roasted malt flour | 2.58 |
| | Calcium Propionate | 0.33 |
| | Sodium bicarbonate | 0.30 |
| | BHA/BHT Powder | 0.03 |
| | TOTAL | 100 |
| EXTRUSION | Dry Mix | 76.38 |
| | Glycerin | 11.46 |
| | Water | 11.22 |
| | Phosphoric acid | 0.94 |
| | TOTAL | 100 |

The extruder was equipped to achieve shearing in the last section of the screw. The screw turned at 50-100 rpm. Temperature of the barrel of the screw was controlled. The plastic dough was then extruded through a die system with opening shown in FIG. 6 and cut into 127 mm long pieces having a porous structure (FIG. 1) and density 0.9 Kg/L. The die with dovetail design (FIG. 6) was found to avoid a blistered, rough outer surface and produce an acceptably smooth outer surface (FIGS. 7A and 7B), and the edible chew had an expanded cellular internal structure (FIG. 11).

Example 8

Figure 9C:
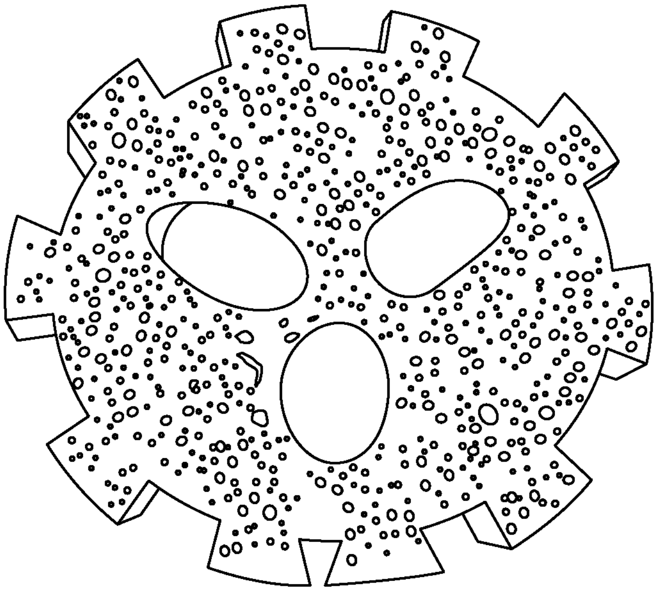
FIGS. 9C and 9D are photographs of an edible pet chew made by the embodiment of the device shown in FIG. 9A and the embodiment of an extrusion die shown in FIG. 9B.
Figure 9D:
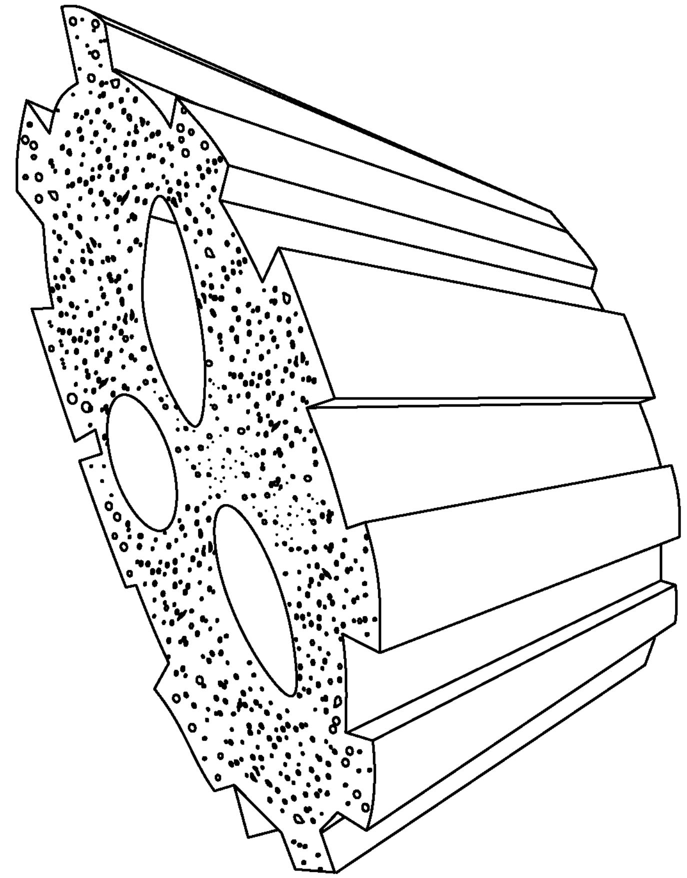

For variation, multiple tubular inserts (FIG. 9B) were inserted within the die opening to form several hollow parts in the product piece (FIGS. 9C and 9D). The hollow sections were filled with a functional dough or paste using a system having a co-filling port (FIG. 9A).

Example 9

A dental efficacy test was carried out with products made according to Example 4 with star-shaped hollow pieces of weight 26 g (Experimental) and compared with a commercial dental product (Commercial) with similar ingredients that was not expanded (puffed). The following test protocol was employed:

16 medium dogs selected (good health and have none of the considered teeth missing)

Testing—crossover design: each dog was submitted to control diet (wet food) and experimental diet (wet food+1 dental stick) 1 stick of 26 g represented 10% of the daily energy intake for a medium dog Preliminary phase: 1 week adaptation to allow dogs to get accustomed to dental product Followed by teeth cleaning and polishing/weight control 1st phase: for 28 days, group 1 (8 dogs) received control diet and group 2 (8 dogs) received experimental diet Gingival index, plaque & tartar development scoring was done on considered teeth and followed up with teeth cleaning and polishing 2nd phase: for the next 28 days, group 1 (8 dogs) received experimental diet and group 2 (8 dogs) received control diet Gingival index, plaque & tartar development scoring on considered teeth/teeth cleaning and polishing This procedure was repeated with 26 g pieces of the commercial dental product.

Statistical analyses were carried out on both sets of data, and the results are shown in Table 4.

TABLE 4

| | | Plaque Score | | Tartar Score | | | |
|---|---|---|---|---|---|---|---|
| | Gingival Score Average gingivitis score reduction | % of dogs with a positive reduction of plaque buildup | Average plaque buildup reduction score | Highest tartar buildup reduction score recorded | % of dogs with a positive reduction of tartar build up | Average tartar build up reduction score | Calorie Density Kcal/cm$^3$ |
| Commercial Product | NS | 62.50% | 10.90% | 57.60% | 86.70% | 32.70% | 3.6 |
| Experimental Product | 19.00% | 81.20% | 18.40% | 70.00% | 100.00% | 52.40% | 2.1 |

From these results, it is clearly seen that the puffed (expanded) product had better dental cleaning scores than a current unexpanded similarly formulated commercial dental product on an equal calorie basis.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method of making an edible pet chew, the method comprising:

preparing a dry mix comprising a pre-gelatinized cereal flour and further comprising sodium bicarbonate that is 0.2 to 1.5 wt. % of the dry mix;

metering the dry mix into an extruder comprising an extrusion die, the extruder further comprises a barrel comprising a vent and a vent-stuffer;

adding a polyhydric solvent to the dry mix to form a dough;

using the vent to provide ambient pressure in the extruder;

aerating the dough in the barrel comprising the vent and the vent-stuffer;

using a reverse element of the extruder to extend a time spent by the dough in the barrel comprising the vent and the vent-stuffer;

using mixing elements in the barrel comprising the vent and the vent-stuffer to whip the dough and promote nucleation;

promoting further nucleation of the dough by subjecting the dough to a combination of shear and temperature of at least 120° C. in the extruder, wherein the combination of shear and temperature is applied to the dough in a section of the extruder adjacent to the extrusion die, wherein the temperature in the section adjacent to the extrusion die is higher than a temperature of at least one previous section of the extruder; and directing the nucleated dough through an opening of the extrusion die comprising grooves, each of the grooves has an open end and a bottom surface opposite to the open end, and the width of the bottom surface is greater than the width of the open end, wherein the grooves have a substantially triangular cross-section, have a width that continuously decreases as the grooves extend toward the center of the opening, and are evenly spaced along an inner periphery of the opening of the extrusion die.

2. The method of claim 1, wherein the edible pet chew has a density not greater than about 1.0 Kg/L.

3. The method of claim 2, wherein the edible pet chew has a caloric density of 1.5-2.7 Kcal/cm$^3$.

4. The method of claim 2, wherein the density of the edible pet chew is at most about 0.9 Kg/L.

5. The method of claim 1, wherein the opening of the extrusion die has a center and an outer periphery, the bottom surface of each of the grooves is positioned along the outer periphery, and the distance from the open end of each groove to the center is less than the distance from the bottom surface to the center.

* * * * *